(12) United States Patent
Margetts et al.

(10) Patent No.: US 6,516,639 B1
(45) Date of Patent: Feb. 11, 2003

(54) STORAGE CASE

(75) Inventors: Mark Geoffrey Newland Margetts, Powys (GB); Neil Adrian Eaton, Bridgnorth (GB); Andrew William Fisher, Leicester (GB); Simon Day, Melton Mowbray (GB); Mark Daniel Bagnall, Bristol (GB)

(73) Assignee: Carling Point Limited, Llanfechain (GB)

(*) Notice: Subject to any disclaimer, the term of this patent is extended or adjusted under 35 U.S.C. 154(b) by 0 days.

(21) Appl. No.: 09/787,797

(22) PCT Filed: Sep. 16, 1999

(86) PCT No.: PCT/GB99/03084

§ 371 (c)(1),
(2), (4) Date: Aug. 10, 2001

(87) PCT Pub. No.: WO00/17877

PCT Pub. Date: Mar. 30, 2000

(30) Foreign Application Priority Data

Sep. 22, 1998 (GB) .............................................. 9820500

(51) Int. Cl.⁷ .............................................. E05B 65/00
(52) U.S. Cl. ................................ 70/57.1; 70/58; 70/63; 206/308.2; 206/1.5
(58) Field of Search ............................. 70/57.1, 58, 63; 206/1.5, 308.2, 387.11

(56) References Cited

U.S. PATENT DOCUMENTS

| 4,153,178 | A | | 5/1979 | Weavers |
| 4,469,225 | A | | 9/1984 | Takahashi |
| 5,147,034 | A | * | 9/1992 | Broadhead et al. .......... 206/1.5 |
| 5,375,708 | A | * | 12/1994 | Wittman .................. 206/315.1 |
| 5,680,782 | A | * | 10/1997 | Komatsu et al. ............. 70/54.1 |
| 5,762,187 | A | * | 6/1998 | Belden, Jr. et al. ...... 206/308.2 |
| 5,850,752 | A | * | 12/1998 | Lax .............................. 70/276 |
| 5,901,840 | A | * | 5/1999 | Nakasuji ..................... 206/1.5 |
| 6,374,648 | B1 | * | 12/2000 | Mitsuyama .................. 70/57.1 |
| 6,430,976 | B1 | * | 8/2002 | Mitsuyama .................. 70/57.1 |
| 2002/0003095 | A1 | * | 1/2002 | Jaeb et al. ............... 206/308.2 |

FOREIGN PATENT DOCUMENTS

| EP | 0 483 422 A | 5/1992 |
| EP | 0 589 551 A1 | 3/1994 |
| EP | 0 653 534 A | 5/1995 |

* cited by examiner

Primary Examiner—Anthony Knight
Assistant Examiner—Lisa Bannapradist
(74) Attorney, Agent, or Firm—Renner, Otto, Boisselle & Sklar, LLP

(57) ABSTRACT

A storage case comprises a top portion and bottom portion adapted to abut each other in a closed position. A locking strip is mounted on an edge of the closed storage case. The top portion and bottom portion receive the locking strip. The storage case comprises formations receivable by said locking member such that said locking member and said storage case is in a locked position.

6 Claims, 12 Drawing Sheets

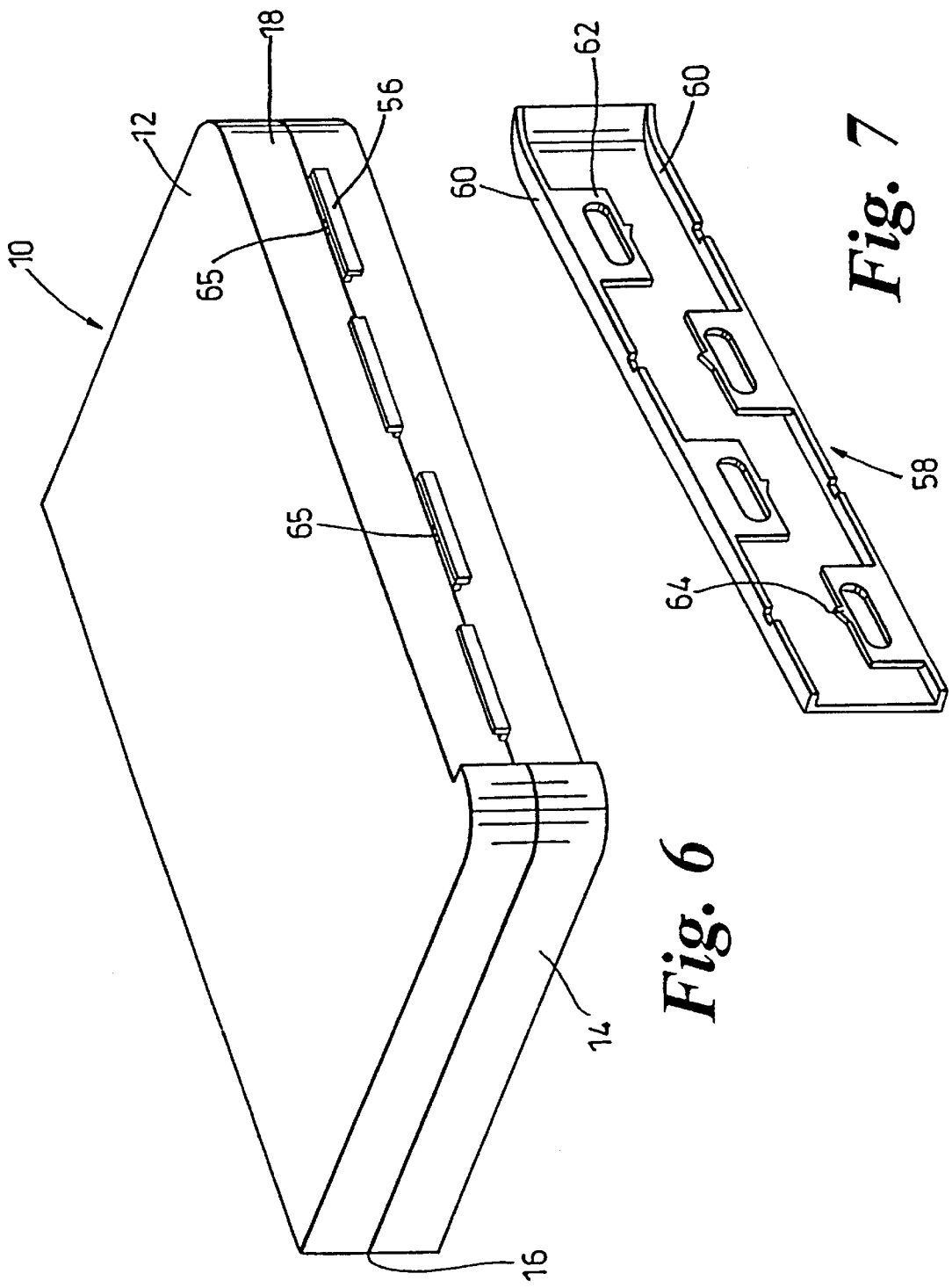

STORAGE CASE

This invention relates to a storage case. More particularly but not exclusively this invention relates to a lockable storage case for use with video tapes, compact discs, cassettes, computer games etc.

It is known to provide the cases of saleable items such as videos and compact discs with security devices to attempt to dissuade a potential thief from stealing. Such devices include plastic clips which may only be removed by a tool at the cashiers desk. These devices tend to be bulky and inhibit attractive display of the products.

A large number of retailers display only the cases of the products and store the actual products e.g. videos, in a secure location only accessible by store personnel. However, this requires more retail space and is time consuming when a customer wishes to make a purchase.

Another security device is a label which activates a security system when the product, to which it is applied, passes through the exit of the store. Such labels may, however, be easily peeled off the product.

EP-A-0 589 551 discloses a storage case having first and second leaves that are hingeable between a closed position in which portions of the leaves abut one another; and an open position. The leaves define a hollow interior of the storage case that is accessible, when the case is in its open position, for insertion and removal of articles.

The abutting portions of the leaves define a wall that includes a lock for locking the leaves in the closed position. The lock includes an elongate recess and a detachable locking member.

The abutting portions include grooves that are engageable by correspondingly shaped grooves formed on the locking member. Deflectable tabs, accessible via slots in the locking member, engage formations on the locking member when the latter is slid along the grooves to a locking position.

The arrangement of EP-A-0 589 551 suffers two main disadvantages.

The first is that the interengaging grooves on the abutting portions and the locking member mean that the locking member is exposed on the exterior of the storage case during use. Consequently it is easy for a thief to prise the locking member off the storage case, or otherwise render it inoperative.

Secondly the use of slots in the locking member, to provide access to the deflectable tabs, means that any unlocking tool must slide with the locking member as the latter is removed from the storage case. Consequently there is a risk of the unlocking tool moving out of engagement with the tabs before the locking member is completely unlocked.

EP-A-0 653 534 discloses another locking arrangement in which a U-shaped locking member encloses the abutting portions of the storage case.

The U-shaped member is in two parts, that are engageable with one another to define the U-shape. One of the parts of the U-shaped member includes formations that are engageable with deflectable tabs on the storage case.

The locking member of EP-A-0 653 534 suffers the same disadvantages as the EP-a-0 589 551 arrangement, because the locking member is exposed on the exterior of the storage case; and because an unlocking tool must pass through apertures in a moveable component in order to release the deflectable tabs.

In both the prior art arrangements the presence of deflectable tabs on the storage case complicates manufacture of the case and potentially shortens the life of the case.

According to the invention there is provided a storage case as defined in claim 1.

Further, advantageous features of the invention are defined in the dependent claims.

In a storage case in accordance with the invention the locking member is releasable but it is intended that the locking member can only be readily released to unlock a locked storage case by use of a special tool. It is intended that such a tool will be available only to those authorised to have access to the contents of the storage case.

An embodiment of the invention will now be described by way of example with reference to the accompanying drawings in which:

FIG. 6 is a perspective view of another lockable storage case not forming part of the invention;

FIG. 7 is a perspective view of the locking plate for use with the lockable storage case of FIG. 6;

In the following description the embodiment of FIGS. 1 to 10 do not form part of the invention but are described for purposes of illustrating some principles of the invention.

Referring to FIGS. 1 to 4, a storage case shown generally at 10 comprises a top portion 12 and a base portion 14. The top and base portions 12, 14 are formed as a single piece plastic moulding and are hinged about closed edge 16. The storage case itself comprises an internal hollow rectangular storage portion (not shown) suitable for receiving a video tape.

Figure 1:
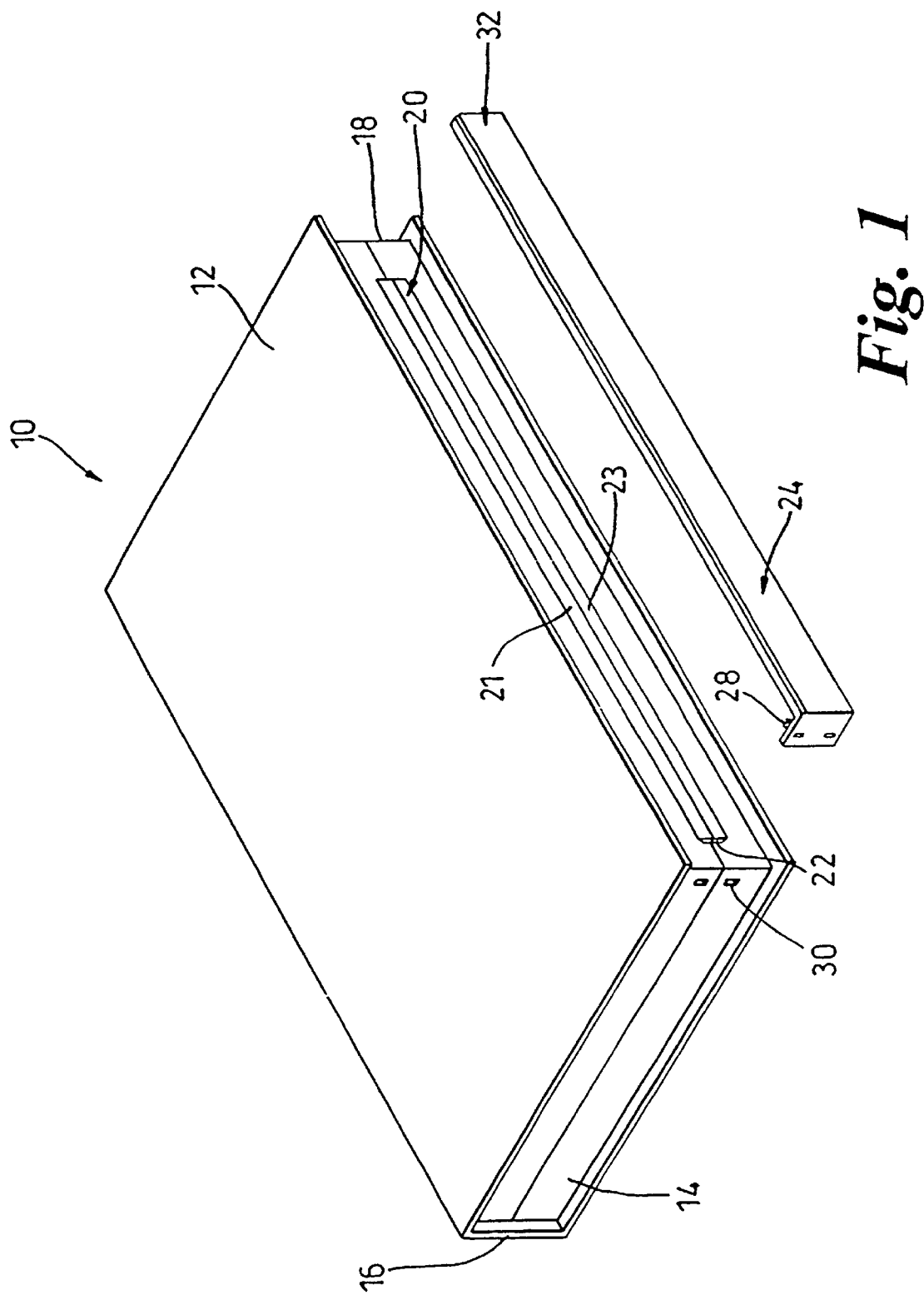
FIG. 1 is a perspective view of an embodiment of a storage case not forming part of the invention with the locking spline removed.
Figure 2:
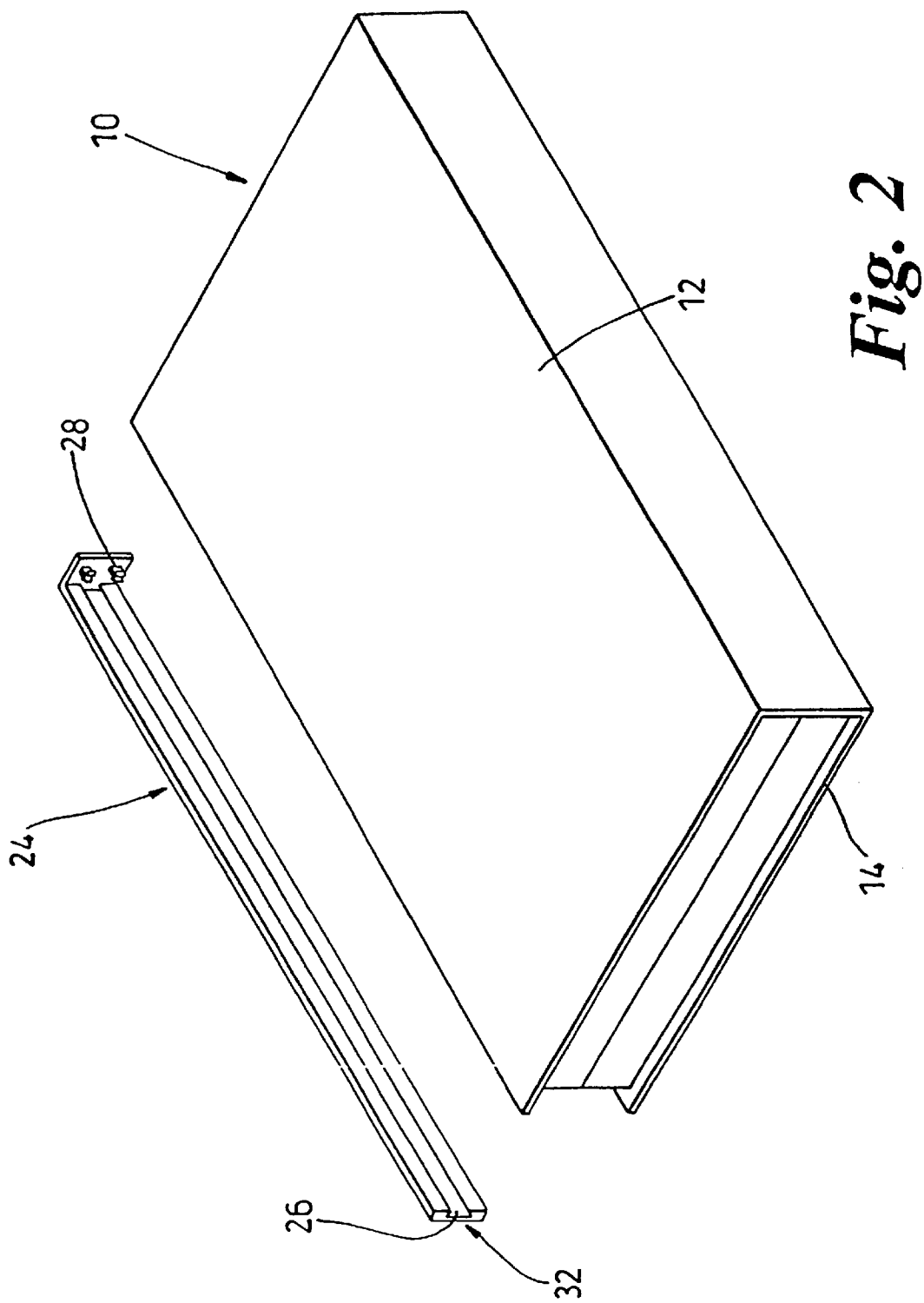
FIG. 2 is another perspective view of a locking spline for use with the storage case of the invention shown in FIG. 1.
Figure 3:
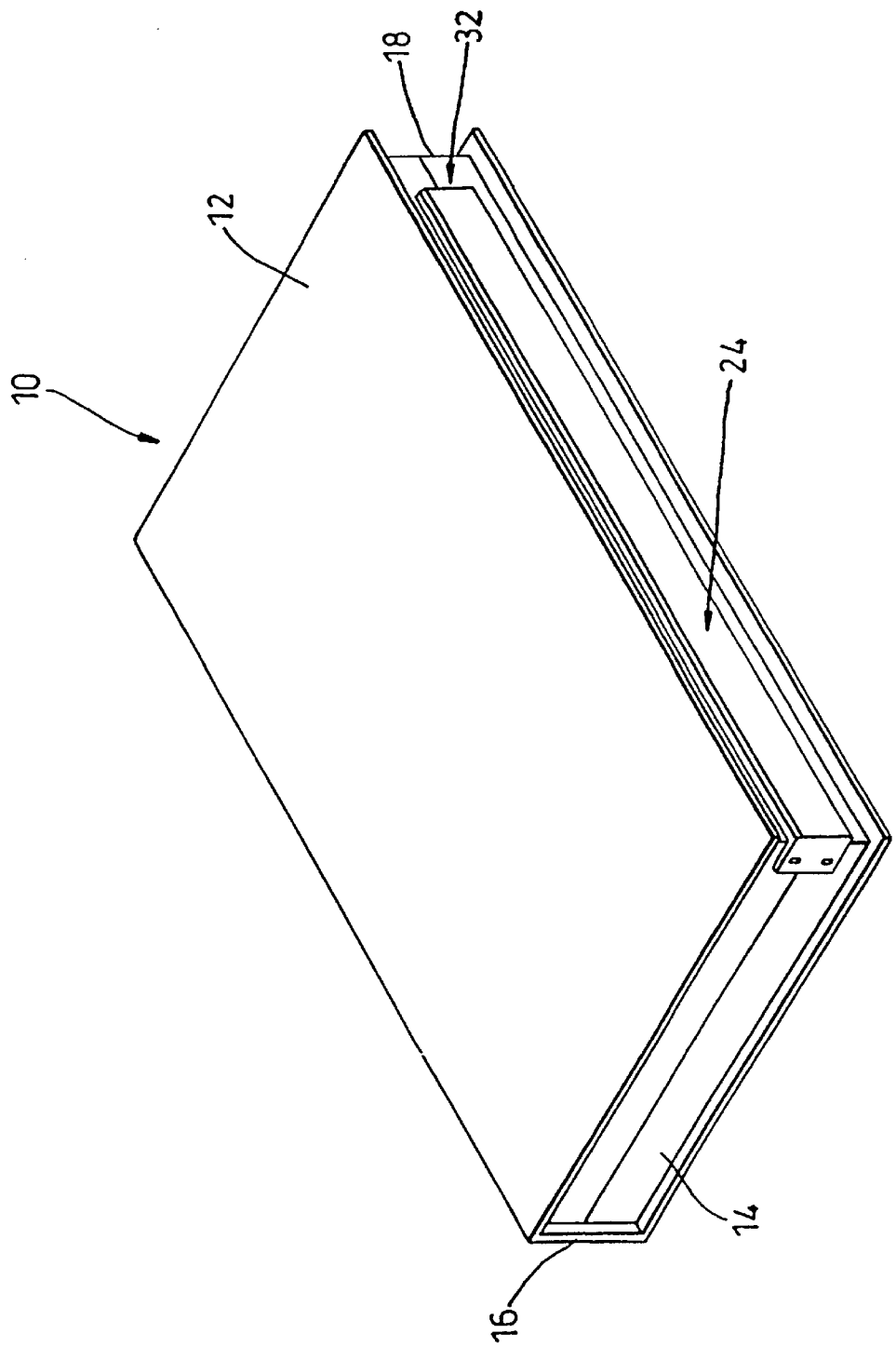
FIG. 3 is a perspective view of the storage case shown in FIG. 1 of a storage case with the locking spline in the locked position.

The opening edge 18 of the case 10 is formed with a strip 20. This strip 20 is formed with a dovetail portion 22 and is formed in two halves 21, 23. The top half 21 is attached to the top portion 12 of the storage case and the bottom half 23 is likewise attached to the bottom half 14. In the storage case closed position as shown in FIG. 1 both halves 21, 23 of the locking strip 20 abut each other along their lengths. A removable L-shaped locking spline 24 is formed with a dovetail shaped slot 26 corresponding to the dovetail portion 22 of the storage case 10.

Flexible locking clips 28 are formed on the inside of the L-shaped locking spline 24. These locking clips 28 are adapted to be securely fitted within corresponding slots 30.

In use the locking spline 24 is slid onto the locking strip 20 via its open end 32 and the dovetail slot 26 and portion 22. Once the locking strip 24 is in place the locking clips 28 are press fitted into the receiving slots 30 to provide secure location of the spline 24 on the storage case 10.

Once the locking strip is in its secured position, the contents of the case are not accessible unless the strip 24 is removed by the use of tool adapted to fit into the slots 30 and push the clips 28 out of the slots 30 hence removing the locking strip 24. Such a tool (not shown) would, in use, only be available, for example, to the cashier.

Figure 4:
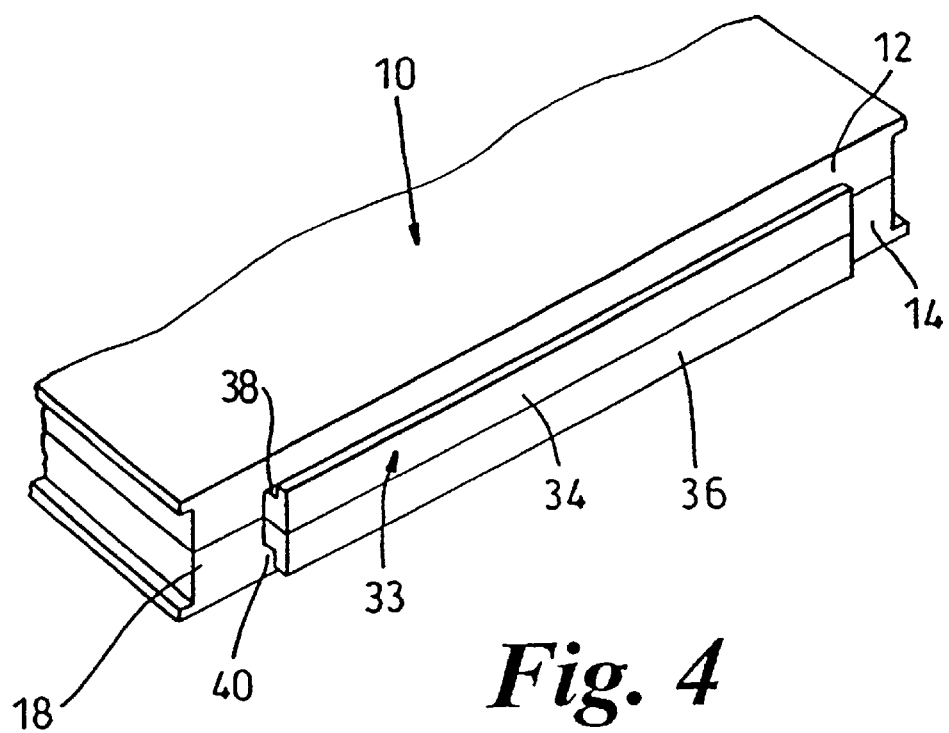
FIG. 4 is a perspective view of another storage case not forming part of the invention.
Figure 5:
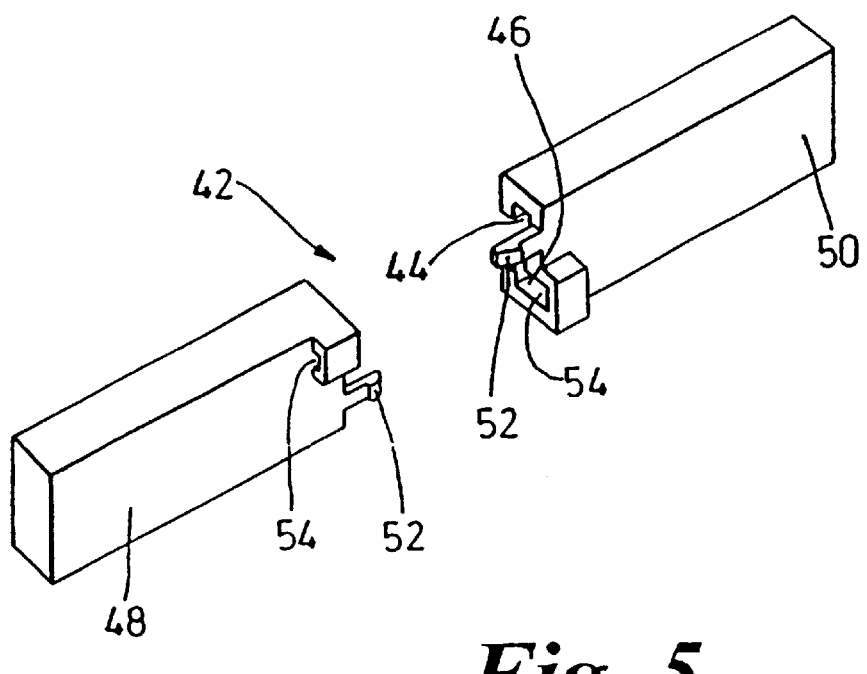
FIG. 5 is a perspective view of the locking spline of the arrangement shown in FIG. 4.

A second embodiment is shown in FIGS. 4 and 5 of the drawings. Referring to these drawings, storage case 10 comprises an opening edge 18. This edge 18 is formed with a locking strip 33 formed in two portions 34, 36. Top portion 34 is mounted on the top opening half 12 of the storage case 10 and lower portion 36 is formed on the bottom opening half 14. When the storage case is in the closed position the halves of the locking strip 33 abut each other.

Locking strip 33 is formed with a groove 38 in its top portion and a groove 40 formed in its bottom portion. These groves are shaped so as to be capable of receiving corresponding U shaped portions 44, 46 of locking spline 42. Locking spline 42 is formed in two halves 48, 50. Each half 48, 50 is formed with a flexible locking clip 52.

In use each half of the spline 42 is positioned over a different end of the strips 32. The two halves are pushed together until the flexible locking clips 52 are securely retained in corresponding locking slots 54. The locking spline halves may only be removed by use of a tool (not shown) formed to locate in locking slots 54 to push the clips 52 out of position.

Figure 8:
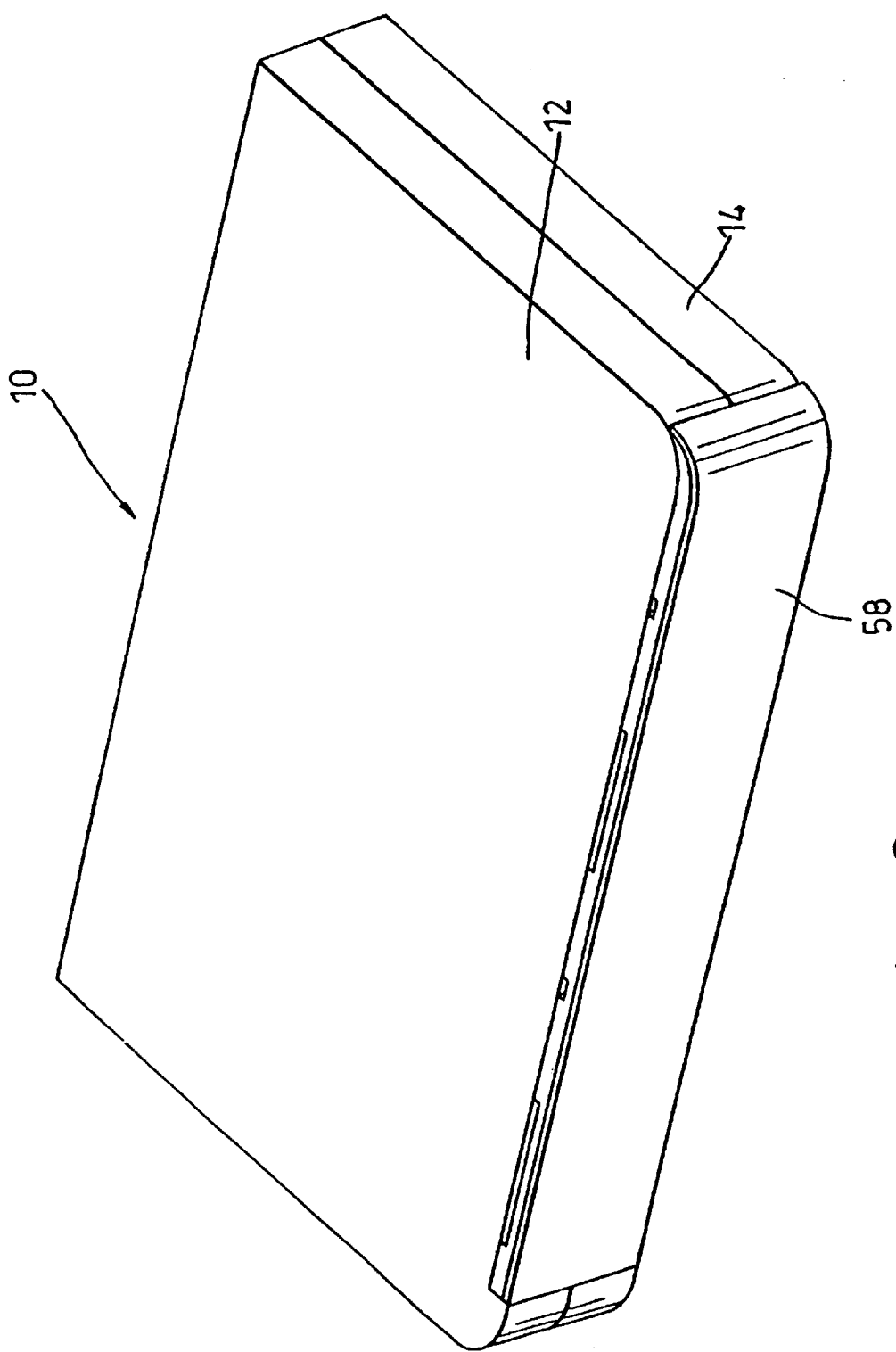
FIG. 8 is a perspective view of the lockable storage case of FIG. 6 with the locking plate of FIG. 7 in the locking position.

Referring to FIGS. 6 to 8 a storage case 10 again comprises top and base portions 12, 14. Opening edge 18 is formed with a number of L shaped clips 56. These clips 56 are alternately mounted on the opening edges of top and bottom halves 12, 14 of the storage case 10.

A locking plate 58 comprises two locating walls 60 and a number of rectangular formations 62. Each formation 62 comprises a triangle shaped tooth 64 each shaped to be received in corresponding slots 65 formed in clips 56. In use the locking plate is slid onto the opening edge of the storage case, over the slips 56. The teeth 64 are located in their corresponding slots 65 in a snap fit operation. Once in position on the storage case 10 the locking plate 58 forms a neat flush fit with the video storage case 10.

The locking plate 58, once in position on the storage case 10, may only be removed by depression of the teeth 64 using a suitable removal tool (not shown).

Figure 9:
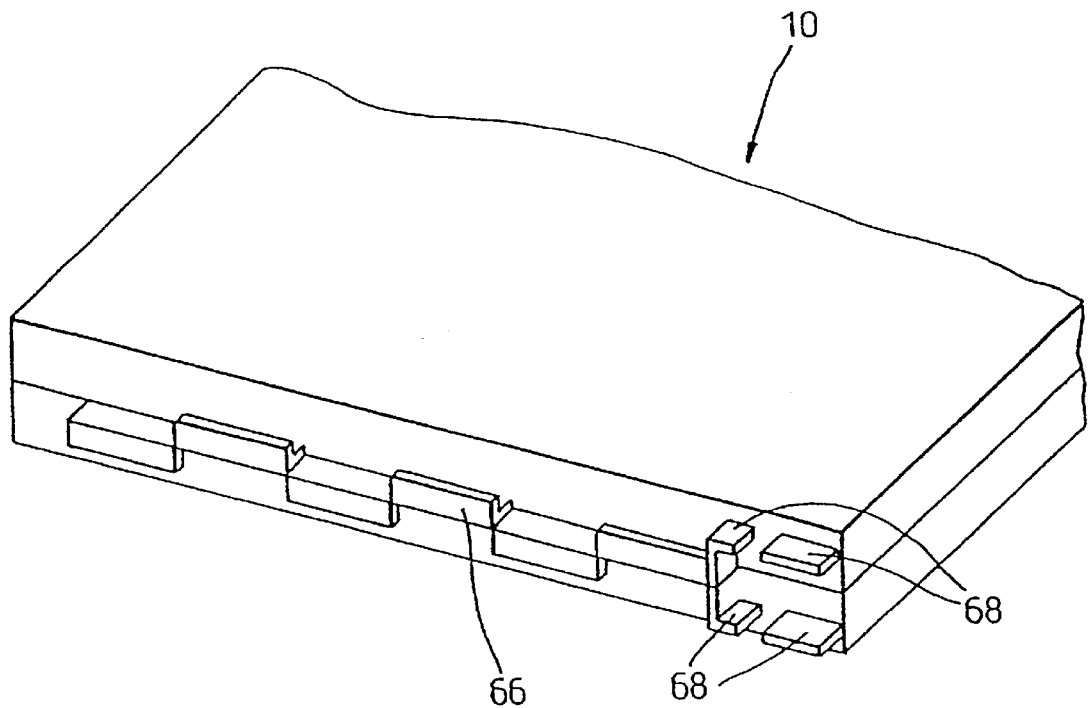
FIG. 9 is a perspective view of yet a further lockable storage case not forming part of the invention.
Figure 10:
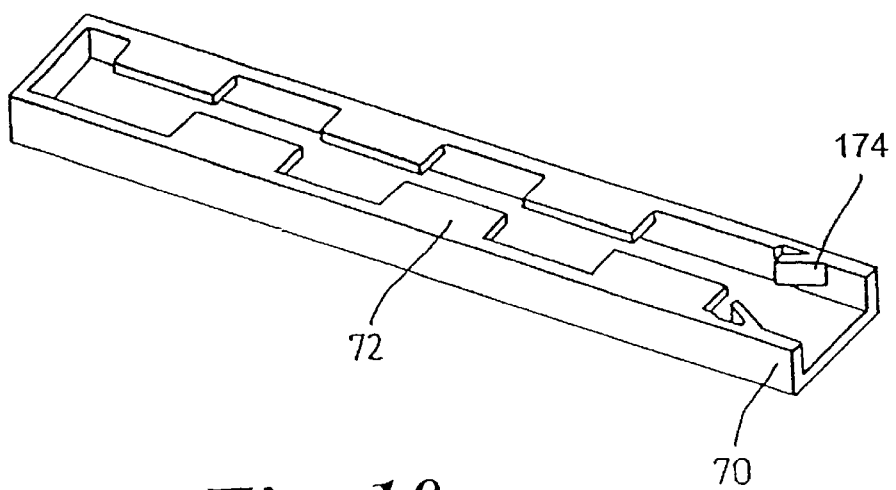
FIG. 10 is a perspective view of the locking plate for use with the lockable storage case of FIG. 9.

Now referring to FIGS. 9 and 10 a storage case 10 is formed with a number of L shaped clips 66. At one end of the opening edge 18 of the storage case, locating members 68 are formed. These enable the locking plate 70 to be slit onto the storage case. Locking plate 70 is formed with a number of teeth 72, corresponding to the number of clips 66. The locking plate 70 is also formed with two flexible clips 174.

In use the locking plate 70 is slit onto the opening edge of the storage case and each tooth 72 is located behind a corresponding L shaped clip 66. The flexible clips 174 slide over the locating members and position the locking plate in a snap fit type operation.

Once the locking plate 70 is in position on the storage case 10, the flexible clips 74 abut the locating members 68 thus preventing movement of the locking plate in a direction parallel to the edge 18 of the storage case 10. The teeth 72 abut their corresponding clips 66 thus preventing the locking plate from being removed in a direction perpendicular to edge 18. Thus removal of the locking plate is difficult without the use of a spacial tool to depress flexible clips 174.

Figure 11:
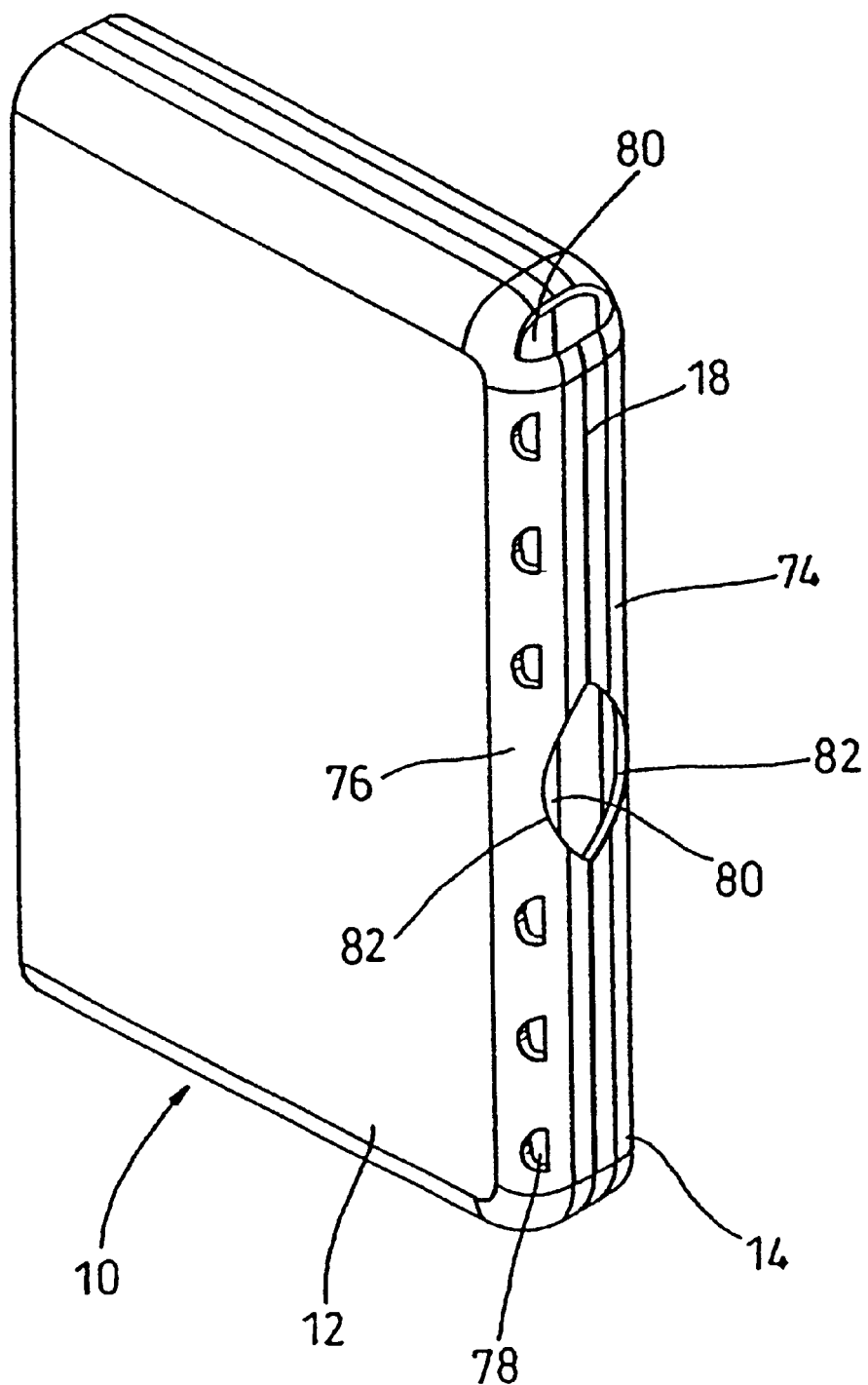
FIG. 11 is a perspective view of a lockable storage case according to the invention.
Figure 12:
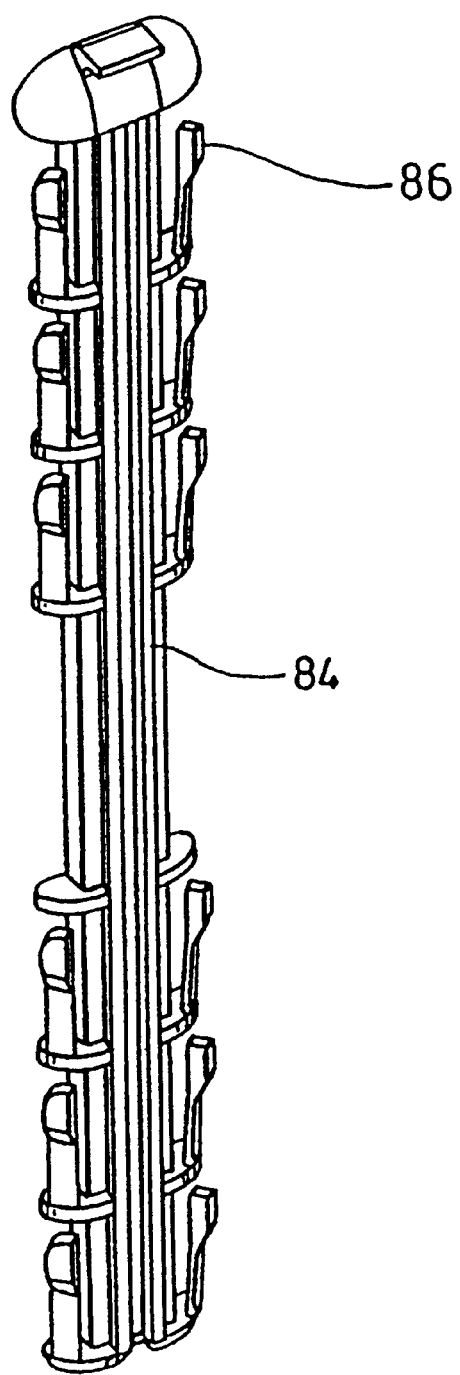
FIG. 12 is a perspective view of a locking member for use with the case of FIG. 11.
Figure 13:
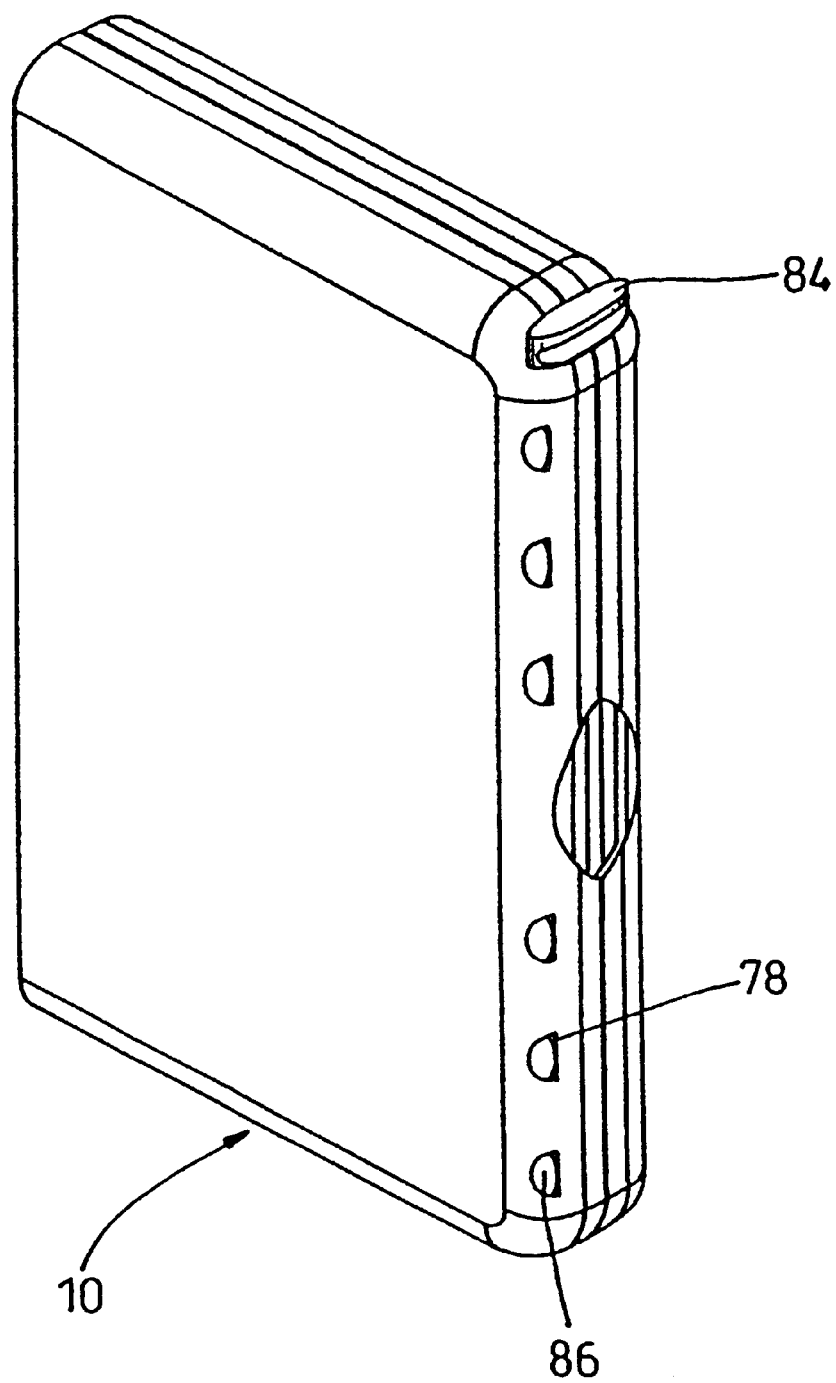
FIG. 13 is a perspective view of a locked storage case of FIG. 11 with the locking member of FIG. 12 in position.

Now referring to FIGS. 11 to 13, storage case 10 according to the invention comprises a top portion 12 and a base portion 14. The opening edge 18 of the storage case 10 is formed with a moulded end strip. This end strip is formed in two halves 74, 76. When the storage case 10 is in the closed and unlocked position as shown in FIG. 11 the two halves 74, 76 abut each other to form a hollow section 80. Each half comprises a number of slots 78 and an opening cut out portion 82 to provide easy access for a thumb or a finger when opening. Slot 80 is formed to receive locking member in the form of plate 84 as shown in FIG. 12. Locking plate 84 is formed with a number of teeth 86.

Figure 14:
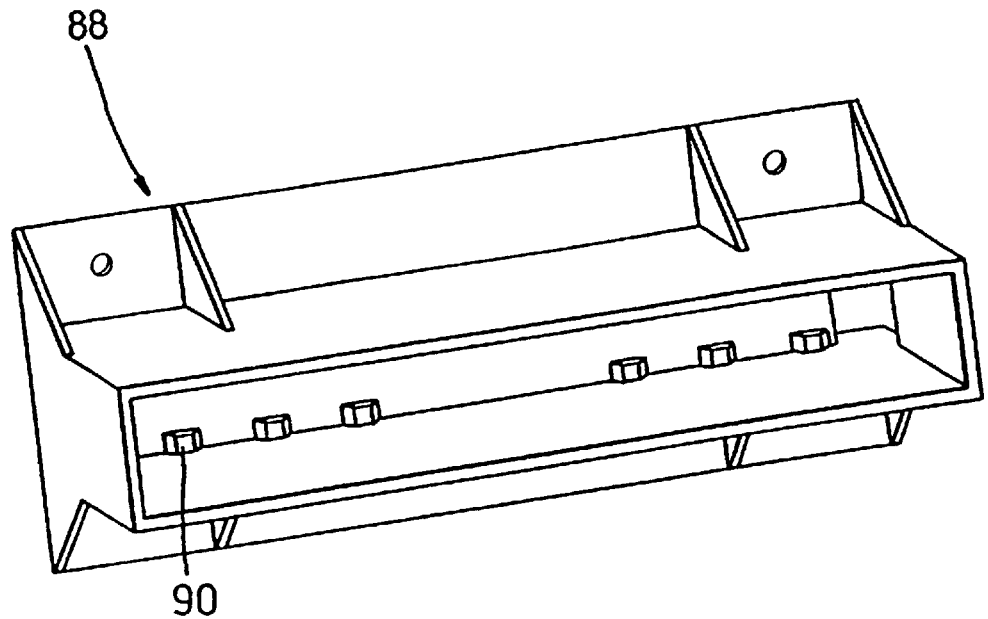
FIG. 14 is a perspective view of a tool for unlocking the locking member of FIG. 13.
Figure 15:
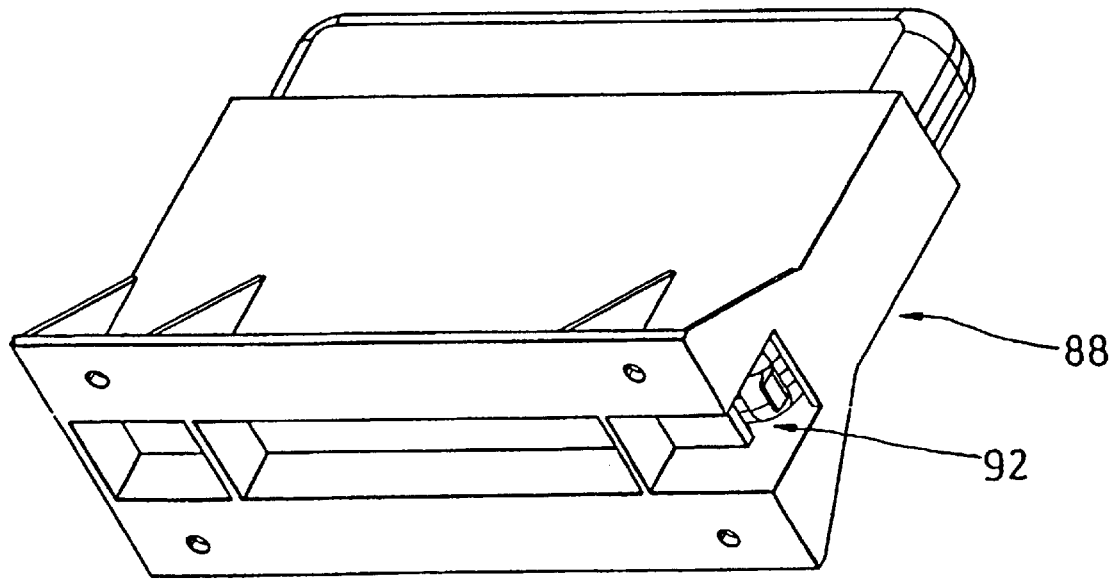
FIG. 15 is a perspective view of the storage case of FIG. 13 in position within the unlocking tool of FIG. 14.
Figure 16:
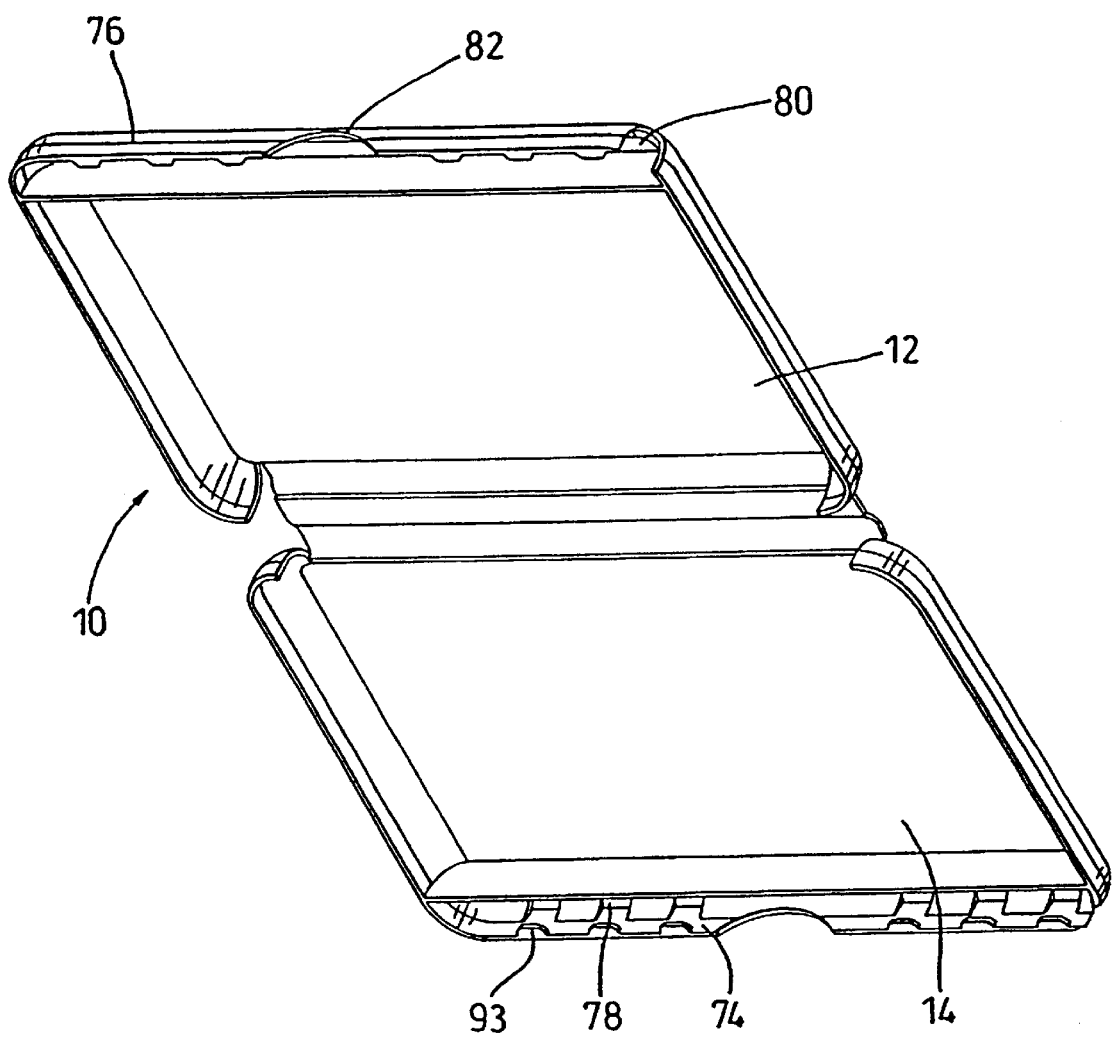
FIG. 16 is a perspective view of the storage case of FIG. 13 in an open condition.

In use the locking plate 84 is slid into the opening 80 of a closed storage case 10 thus ensuring the locking plate 84 cannot be withdrawn without use of a special tool. Teeth 86 are located within their corresponding slots 78 thus ensuring the case 10 remains in a closed position. The locking plate 84 may be removed by depression of the teeth 86 from their slots by use of a suitable tool An example of a suitable tool 88 is shown in FIGS. 14 and 15. A locked storage case with the locking plate 84 in position is shown in FIG. 13.

When removing the locking plate all the locking teeth 86 are depressed simultaneously by the action of protrusions 90 of the locking tool. Thus the teeth 86 disengage from the case 10. The locking plate 84 may be withdrawn longitudinally through aperture 92 of the locking tool 88 and the protrusions 90 fill the slots 78 of the storage case.

Advantageously the positioning of the locking plate over one edge of the storage case prevents access unless by use of a release tool. Thus contents of the storage cases are provided with improved security. The locking plates 84 are formed as splines engaging with tabs 93 positioned on both sides of the storage case hence preventing access to the storage case 10 without the use of such a special tool to depress relevant formations of each embodiment of the invention. It is also envisaged that the storage case and locking mechanism of the present invention may be suitable for use as a tamper proof "evidence" case for criminal investigation work.

What is claimed is:

1. A storage case comprising first and second leaves hingedly secured together to permit hinging of the leaves between a closed position of the case in which portions of the leaves abut one another; and an open position, the leaves defining a hollow interior of the storage case that is accessible, when the leaves are in the open position, for insertion and removal of articles, the abutting portions of the leaves defining a wall, of the storage case, that includes a lock for locking the leaves in the closed position, the lock including an elongate recess and a detachable locking member, characterised in that there are wall portions, secured on the respective leaves, that are spaced from the abutting portions of the leaves whereby in the closed position the wall portions lie adjacent one another to define, with the abutting portions of the leaves, the recess, each said wall portion including a plurality of slots and the locking member including a plurality of depressible teeth and being insertable into the recess such that slots in both the wall portions are engaged by teeth on the locking member to secure the locking member in the recess, the locking member engaging tabs positioned on both sides of the storage case to prevent access thereto.

2. A storage case according to claim 1 wherein the locking member is removable on simultaneous depression of the teeth out of their associated slots to permit removal of the locking member from the recess.

3. A storage case according to claim 1 wherein the wall portions each include formed therein an opening that permits insertion of a thumb or finger to assist opening of the leaves when the locking member is absent.

4. A storage case according to claim 3 wherein the openings are located so as to define a single, continuous opening in the wall portions when the leaves are in the closed position.

5. A tool for releasing a locking member from a storage case according to claim 2, the tool comprising a plurality of protrusions that act on the slots of the recess characterised in that the slots are engaged by teeth of the locking member, the tool being capable of depressing the teeth out of the associated slots to permit withdrawal of the locking member from the recess.

6. A storage case according to claim 1 wherein the locking member is slideably receivable in the recess.

* * * * *